(12) United States Patent
Noble, Jr. et al.

(10) Patent No.: US 9,787,839 B1
(45) Date of Patent: *Oct. 10, 2017

(54) ACCURATE DISPOSITIONING OF A TELEPHONE CALL BY RECONCILING CAUSE CODES WITH IN-BAND AUDIO INFORMATION

(71) Applicant: Noble Systems Corporation, Atlanta, GA (US)

(72) Inventors: James K. Noble, Jr., Marietta, GA (US); Chad Hitchcock, Johns Creek, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,732

(22) Filed: Nov. 16, 2016

Related U.S. Application Data

(63) Continuation of application No. 15/159,265, filed on May 19, 2016, now Pat. No. 9,538,009.

(51) Int. Cl.
*H04M 3/00* (2006.01)
*H04M 5/00* (2006.01)
(Continued)

(52) U.S. Cl.
CPC ....... *H04M 3/5175* (2013.01); *H04M 3/2218* (2013.01); *H04M 3/5158* (2013.01);
(Continued)

(58) Field of Classification Search
CPC .. H04M 3/5175; H04M 7/129; H04M 3/2218; H04M 3/5158; H04M 2207/08; H04L 65/1006
(Continued)

(56) References Cited

U.S. PATENT DOCUMENTS 6,453,039 B1 * 9/2002 Cutting ................. H04M 3/523
379/265.11
9,137,369 B1 9/2015 Mammem
(Continued)

OTHER PUBLICATIONS

Nobles Systems Corporation, Maestro 2010.4.1 User Manual, vol. 1, Jan. 11, 2012, 486 Pages, Noble Systems Corporation, Atlanta, GA 30319.

(Continued)

*Primary Examiner* — Quynh Nguyen

(57) ABSTRACT

A telephone call to a remote party may encounter a number of abnormal conditions, which prevents the call from being offered to the remote party's interface. These conditions may be indicated to the calling party using call progress information conveyed as out-of-band information, in the form of signaling elements and/or as in-band information, in the form of audio information. The audio information may include a special information tone and/or an intercept announcement. The call handler originating the outbound call may provide the audio information to a speech analytics component that analyzes the audio information. The analyzed audio information may be reconciled with the out-of-band information. Various rules can be applied to ascertain how to disposition the call in instances where the in-band and out-of-information are inconsistent. Once reconciled, accurate call disposition information can be recorded in the call record for that call.

20 Claims, 7 Drawing Sheets

(51) Int. Cl.
  *H04M 3/51*  (2006.01)
  *H04M 3/22*  (2006.01)
  *H04M 7/12*  (2006.01)
  *H04L 29/06* (2006.01)

(52) U.S. Cl.
  CPC ......... *H04M 7/129* (2013.01); *H04L 65/1006* (2013.01); *H04M 2207/08* (2013.01)

(58) Field of Classification Search
  USPC .......................... 379/266.07, 265.01, 265.03
  See application file for complete search history.

(56) References Cited

U.S. PATENT DOCUMENTS

2003/0007616 A1   1/2003   Alves et al.
2005/0232410 A1   10/2005  Gonzalez

OTHER PUBLICATIONS

Nobles Systems Corporation, Maestro 2010.4.1 User Manual, vol. 2, Jul. 19, 2011, 422 Pages, Noble Systems Corporation, Atlanta, GA 30319.

\* cited by examiner

ACCURATE DISPOSITIONING OF A TELEPHONE CALL BY RECONCILING CAUSE CODES WITH IN-BAND AUDIO INFORMATION

RELATED APPLICATIONS

This application is a continuation of U.S. patent application Ser. No. 15/159,265, filed on May 19, 2016, now U.S. Pat. No. 9,538,009, entitled "Accurate Dispositioning Of A Telephone Call By Reconciliating Cause Codes With In-Band Audio Information", the contents of which is incorporated by reference for all that it teaches.

FIELD OF THE DISCLOSURE

The concepts and technologies disclosed herein generally pertain to a system for use in contact centers to improve the accuracy in determining the outcome of a telephone call origination attempt, specifically why the telephone call did not connect to a called party. This is accomplishing by processing various out-of-band signaling elements in call control signaling protocols along with in-band audio information to accurately disposition the call.

BACKGROUND OF THE INVENTION

Contact centers may originate a call to a called party for various reasons, and the call will reach one of a number of possible outcomes. One obvious outcome is that the call may be answered by the called party. In various other situations the call is not answered, nor may it be even offered to the called party. This may be due to, for example, the called number being disconnected, the called party having changed their telephone number, or a failure condition in the network. While such instances may occur relatively infrequently, their occurrence can be expected. Contact centers need to update their records to reflect the outcome of the call and why the call failed—e.g., why the call did not connect in some manner with the called party. For example, if the called number is disconnected, the contact center should update their records accordingly so as to avoid future call attempts to that disconnected number.

In the past, under the so-call "Bell System", telephone service was regulated, and standardized information and procedures were consistently deployed by local and long distance carriers indicating the outcome of a call. With deregulation, there are now a wide number of service providers that a telephone subscriber can use to provide telephone service of one type or another. Further, for a given call, there may be various carriers involved in carrying the call to the remote party other than the call originator's carrier. Finally, various technologies, such as VoIP, may be used when routing the call. As a result of these conditions, it is frequently the case that non-standardized procedures are used.

It is not unusual, depending the carriers or technology involved, that inconsistent information regarding the outcome of a call may be provided to the calling party. The information may be provided to the calling party in the form of audible tones and/or announcements, as well as parameters conveyed by signaling messages. Thus, it may be difficult for call handling equipment to accurately ascertain the outcome of a call if such information is not provided in the appropriate manner. Therefore, mechanisms are needed to allow a contact center to more accurately determine the outcome of a call in light of inconsistent information provided in response to such a call outcome.

SUMMARY

Various embodiments of the present invention allow a contact center to process call progress information, including call failure information that is provided both in-band, in the form of audio, and out-of-band, in the form of signaling messages. The in-band audio information may comprise a special intercept tone and/or an intercept announcement, while the out-of-band messages may convey cause codes indicating the outcome of the call. In various circumstances, the out-of-band and in-band information may be inconsistent with each other, and reconciliation may require using various rules to accurately disposition the outcome of the call. For example, in some embodiments, one form of call failure information may take precedence over another form. By accurately dispositioning the call in the contact center, call records may be updated accurately. One possible benefit includes avoiding unnecessary reattempts to telephone numbers which are no longer in service.

As is discussed in greater detail below, the subject matter disclosed herein may be implemented in various forms, including a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
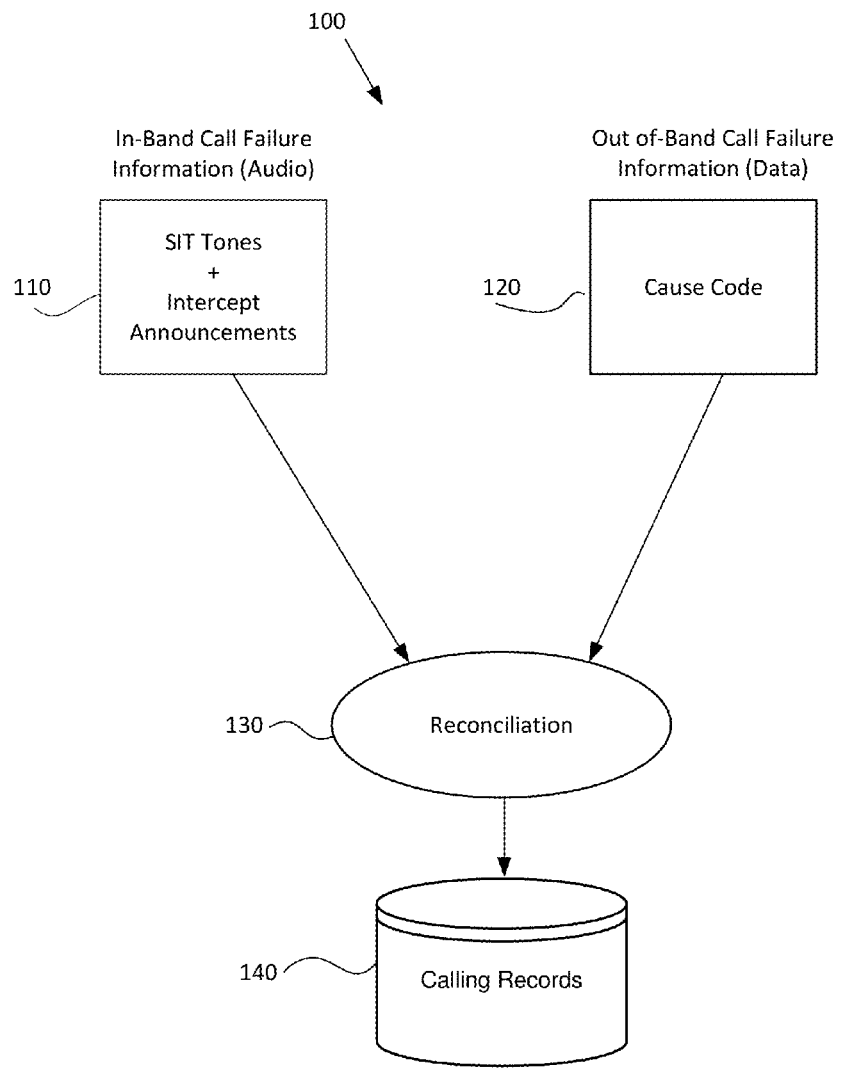
FIG. 1 shows at a high level, an approach for the reconciliation of different types of call failure information.

A subscriber originating a telephone call would normally expect one of three outcomes:

Busy—a busy indication is returned indicating the called party is already using the phone, Ringing (a.k.a. "no-answer")—a ringing signal indicating the phone is ringing and the call is being offered (but where there is no answer), and Answered—when the remote party (or answering machine) answers the call.

If a busy or no-answer condition is encountered, the calling party would typically attempt to originate a subsequent call.

These conditions can be indicated by providing the calling party with audio-based information provided by the telephone network. These are sometimes calls "call progress tones" or "call progress information." For purposes herein, call progress information could be considered as any audio information that informs the calling party of the progress of a call. This audio information is provided "in-band", that is, on the same audio channel as the voice that would be conveyed (assuming the call was answered). The most common form of call progress information is the "ringing" sound when a call is being offered to the remote party. In this case, the calling party knows that the call has been conveyed by the network and has been offered. Of course, if the call is answered, the ringing is terminated and the call is connected. In other situations, a "busy" sound will be played to the calling party, which indicates the call was attempted to be offered, but could not, because the called party is already on a call. Obviously, it can be appreciated that a calling party encountering a busy condition may repeatedly attempt further calls to the called party.

When a telephone call encounters an abnormal condition of some sort, this too often results in the terminating network playing audio-based information to the calling party. In this case, the audio information informs the calling party of an abnormal or call failure condition. An abnormal condition or call failure condition could be considered as anything other than ringing, busy, or answered outcome. The provision of accurate call outcome information is critical, because the calling party may either continue or cease their dialing attempts based on the outcome of the call.

Audio Information Related to Call Failure

To inform the calling party of a call failure condition, the telephone network deployed announcement players, which were configured to play a recorded message each time one of the abnormal conditions was encountered on a call attempt. These were called "intercept" announcements because they intercepted the call, so to speak, from terminating normally to the called party. The intercept announcement was typically a human recorded voice informing the calling party of the particular call failure condition. For example, many individuals may recall having encountered an announcement stating, e.g., "We're sorry; you have reached a number that has been disconnected or is no longer in service. If you feel you have reached this recording in error, please check the number and try your call again." Various announcements were created to reflect the various call failure conditions that prevented the call from being offered to a subscriber. These conditions included: a telephone number which was not allocated, a telephone number which was disconnected, a telephone number that was disconnected but which a new number was known for that same subscriber, network congestion, etc. In addition, intercept announcements were developed to inform the calling party of network congestion, temporary issues preventing the call from being completed, the called telephone number being reassigned, the called party having disconnected service, etc.

Later, to facilitate automation so that machines could detect the call failure information, special intercept tones (a.k.a. special information tones or "SIT") were used. (These are referred to herein as "SIT tones" although, technically, this is redundant since a SIT is a tone.) A particular SIT tone is sometimes also referred to as a "tri-tone." The allowable combinations of tones were defined in the U.S. by the Bell System and later adopted by international standards organization.

SIT tones are a series of three tones with a defined frequency, duration, and cadence, which allows a number of combinations to be signaled thereby reflecting various call failure conditions that a call may encounter. Specifically, the duration involves a "long" duration of 380 milliseconds and a "short" duration of 276 milliseconds. The frequencies of the tone are different based on whether the first, second, or third tone is involved. The first tone could be a 985.2 Hz (High) or 913.8 Hz (Low) signal. The second tone could be a 1428.5 Hz (High) or a 1370.6 Hz (Low) signal. Finally, the third signal was fixed at 1776.7 Hz. In various schemes, this could allow up to 64 combinations to be indicated, but in practice much fewer combinations are actually used. Table 1 reflects one potential embodiment for signaling various conditions.

TABLE 1

| Name | Code | Duration | Frequency | Description |
| --- | --- | --- | --- | --- |
| Reorder—intraLATA | RO' | short, long, long | low, high, low | Incomplete digits, internal office or feature failure—local office |
| Vacant Code | VC | long, short, long | high, low, low | Unassigned N11 code, CLASS code or prefix |
| No Circuit—intraLATA | NC' | long, long, long | high, high, low | All circuits busy—local office |
| Intercept | IC | short, short, long | low, low, low | Number changed or disconnected |
| Reorder—interLATA | RO" | short, long, long | high, low, low | Call failure, no wink or partial digits received—distant office |
| No Circuit—interLATA | NC" | long, long, long | low, low, low | All circuits busy—distant office |
| Ineffective/Other | IO | long, short, long | low, high, low | General misdialing, coin deposit required or other failure |
| Future Use | — | short, short, long | high, high, low | Reserved for future use. |

The SIT tones were designed so that they could be decoded by calling equipment (whether network or customer based) to recognize the particular call outcome. Decoding SIT tones was technologically easier than trying to incorporate technology to detect what recording (i.e., intercept announcement) was being played. Typically, each SIT tone was associated with one or more intercept announcements. On the other hand, the calling party could not easily decode the SIT tone, and hence both the SIT tone and intercept announcement may be provided to indicate the call outcome.

Signaling Information Related to Call Failures

With the development of various signaling networks, digital messages or other forms of signaling were defined to make call establishment faster and more efficient. Various signaling systems, such as Signaling System Number 7 ("SS7") and Integrated Services Digital Networks ("ISDN") were created and deployed, which allowed digital messages to convey a large number of network conditions related to the call outcome, rather than analog audio information. Thus, these messages could convey a large number of possible circumstances surrounding a call.

The SS7 signaling network is often used in telephone networks and the ISDN signaling interfaces allowed customers to utilize a richer set of features that could be offered by the telephone carriers. Both SS7 and ISDN provided signaling means to convey more detailed call failure information. This was conveyed in part via a signaling parameter commonly referred to as a "cause code." This parameter may be conveyed in a signaling message that indicated, at a high level, the state of the call. For example, a common high level signaling message used in the Q.931 protocol of ISDN to establish a call is called the "SETUP" message and it correlates to the "Initial Address Message" in SS7. To end a call, a Q.931 ISDN "RELEASE" message may be used, which correlates to a "RELEASE" message in SS7. When a RELEASE message is conveyed, it contains a cause code parameter indicating various conditions associated with the call, including why the call ended. One skilled in the art will realize that there is great flexibility in such telephony signaling protocols, and that other protocols, messages, and procedures may be involved in ending a call and conveying a cause code.

The values of cause codes are standardized as to the meaning and the value used. Appendix 1 illustrates a listing of ISDN cause codes defined by the Q.931 standard. Typically, only a few values are normally used for most calls. For example, cause code #16 indicates normal call clearing (e.g., the called party ends the call) or cause code #17 indicates the called party is busy. In the vast majority of calls, a small number of cause codes are used. However, in various circumstances, other values may be used to reflect unusual circumstances. For example, during conditions of switching equipment congestion, cause code #42 may be sent. With proper engineering of resources, this condition should rarely occur.

While some conditions occur infrequently, they can be expected to be encountered. For example, cause code #22 indicates the called number has changed. Sometimes the usage of a cause code may appear to overlap with another value. For example, cause code #1 is defined as "Unallocated (unassigned) number" and appears to duplicate cause code #22, which indicates the number has changed. Thus, it may not be always clear when a particular cause code should be used for a particular situation. In another example, example, cause code #41 is "temporary failure" whereas cause code #27 is "destination out of order." A temporary failure may be the reason why a destination is out of order.

Similarly, SS7 developed a set of cause codes, and these were closely aligned with ISDN, as the two signaling standards were intended to be complementary and interwork. These were harmonized in an international standard, referred to as Q.850. However, other signaling standards for controlling voice calls, and their cause codes were not as closely aligned. For example, session initiated protocol ("SIP"), which is one protocol that may be used to signal the establishment/teardown of voice calls over the Internet (together, a.k.a. VoIP), has its own list of cause codes. One partial listing is shown in Appendix 2. These cause codes do not match one-for-one with the SS7/ISDN cause codes. Consequently, various vendors may publish their mapping for how Q.850 cause codes are mapped to SIP causes codes, and vice versa, but the mapping may not always be uniform.

For example, one vendor may map Q.850 Cause Code #1 (unallocated number) to SIP code 404. Also, cause code #3 (no route to destination) and cause code #4 (vacant code) also map to SIP code 404. Thus, it is evident that SIP cause code 404 may encompass a number of call failure conditions. In addition, various VoIP providers may provide additional cause-code like information as additional information with the SIP based cause codes. Thus, while the error codes in VoIP may be standardized to a degree, each carrier may include further information that is specific to that carrier.

Other Complicating Factors

At the national level, the telephone network is very large and involves various technologies. New technologies are deployed and interwork with the telephone network at different times, by different carriers, and in different locations. Thus, as new signaling technologies were introduced, interworking with older technologies had to be maintained. Consequently, the overall telephone network at a national level is a mix of different equipment. Some of that equipment may only recognize call failure information that was conveyed via audio information or only by certain types of signaling messages. Thus, it can be appreciated that within telephony network, a variety of evolving technologies may exist and interwork. This means that the calling party may not always receive the call failure information in a cohesive and consistent manner.

In addition, with telecommunications deregulation, the number of telephone carriers and providers has vastly increased in number. These carriers may have various levels of compliance with conventional signaling regulations. Further, many of these new carriers implement VoIP service using SIP or other proprietary or standardized protocols.

With all these variables, it is not surprising that deviations from the conventional signaling procedures exist with respect to indicating call termination conditions. There are a number of carriers that may handle a call and indicate call failure information. These carriers may not always adhere to industry standards, or there may not necessarily be a standard defined for that particular circumstance. Further, because there a number of different, yet similar technologies involved, each carrier may define their own unique procedures and cause codes. While the cause code values themselves are standardized, some carriers may elect to use one code over the other when signaling a particular condition. In addition, various carriers may alter the signaling information as it is conveyed, because of interworking technology. For example, a VoIP carrier terminating a call may signal a call failure using the SIP 404 cause code, but the originator may use ISDN, which requires interworking the SIP cause code to an ISDN cause code. For these instances, even if there are industry standards for interworking signaling message, not every carrier may necessarily adhere to these procedures.

FIG. 1—Problem/Solution Overview

The problem can be depicted via the diagram shown in FIG. 1. FIG. 1 shows a system 100 that receives information for a particular call, which can be divided roughly into two types of information, as described above. First, in-band or audio information may be received, depicted as receiving SIT tones and/or Intercept Announcements 110. This information is conveyed in the same channel as the audio of the voice, and hence is referred to as "in-band" information, because it is audio based and is conveyed on the voice channel. Presumably, SIT tones will properly reflect the call failure condition, but this is not always the case. In some cases, a generic SIT tone will be used, which could reflect any number of specific call failure conditions. The intercept announcement, which is also provided as audio, (i.e., as in-band information on the same channel), may provide further information as to the particulars of the call failure circumstances. However, it is also possible that the intercept announcement itself may be rather generic. For example, an announcement indicating that the call could not be completed, by itself, may provide little value as to why the call failed to reach the called party.

Similarly, the system 100 may also receive out-of-band information about the call failure. This is a form of a message or signaling data, conveyed in the form of cause codes 120 on a signaling channel of some form. The signaling and the corresponding set of cause codes will depend on the interface to the service provider from the customer's perspective. For purposes of illustration, the discussion herein will limit the interface to either ISDN or SIP, but those skilled in the art will recognize that various other signaling protocols could be used, such as SS7, T1, H.323, proprietary protocols, etc.

A process of reconciliation 130 is required, since the SIT tone, the intercept announcement, and the cause code may not always be consistent with each other. Frequently, one of these information indicators may be, by itself, too broad to convey useful information. Thus, focusing on only one type of indicator to ascertain the call failure condition may result in an incorrect determination. Once a set of rules is applied in the reconciliation process 130, then the correct or expected reason for the call failure can be ascertained, and the calling record 140 can be updated to reflect the correct call failure condition. For example, if the call failure condition is due to a temporary network congestion issue, the contact center may attempt to retry that number at a later time. However, if the call failure condition is due to the number being disconnected, then there is no reason to attempt the number again in the near future.

Experience suggests that certain types of mismatches may be more common than other forms. For example, a service provider handling the call at the called party's interface may lump a number of call conditions into a common category for purposes of selecting a cause code. Various conditions that prevent a call from completing may be simply (and incorrectly) mapped to a "busy" cause code (i.e., Q.931 cause code #17, user busy). This may include a number which is suspended, unassigned, disconnected, or changed. A number may be suspended for non-payment of an account, but the carrier may wait a time period to allow the subscriber to cure the non-payment before reallocating the number. However, the service is temporary suspended, although the number is still associated with the called party's account. In another case, an unassigned number may correlate to a telephone number in a block which has not yet been opened by the carrier and allocated to subscribers. Another condition that may be mapped to a "busy" cause code is a changed number. A changed number may be one where the subscriber has obtained a new number. This may be due to the subscriber relocating or desiring to obtain a new telephone number so as to avoid calls from debt collectors. In each case, the service provider could erroneously map all of these conditions to a cause code #17—user busy. While this indicates to the calling party that the call cannot be completed, it incorrectly suggests that the number can be used to reach the called party in the future. Consequently, the calling party may be tempted to try another call attempt in a short while (10 minutes or so).

The problem of improperly characterizing the call outcome is not limited to the calling party merely attempting another call to that number. If the calling party is actually a contact center utilizing a predictive dialer, then each number reported as busy will be retained and repeatedly attempted again. If the number is, in fact, actually disconnected, then that number will be retained on the dialing list and repeatedly attempted over a number of days (with the same results). As time progresses, other numbers on the dialing list may also be disconnected. These numbers will also be retained on the dialing list and repeatedly attempted. As time goes on, the percentage of such numbers in the dialing list increase and more and more resources are consumed dialing disconnected numbers. Eventually, such numbers may be reassigned, at which time it is possible that certain regulatory violations have been committed, due to using an autodialer for calling individuals who have not provided consent to be called at that number. Thus, mischaracterizing telephone numbers as busy, when they are not, wastes an ever increasing number of resources and can result in liability to the contact center operator.

Conversely, if a number is mischaracterized as disconnected, when in fact, it is busy, then a predictive dialer will remove such number from a dialing list and cease attempts to dial it further. Obviously, if the dialer believes the number is disconnected, there is no gain in reattempting subsequent calls to that number. Consequently, valid telephone numbers will be removed from the dialing list, and this may result in adverse unintended consequences. For example, consider individuals who receive reminders to renew their medication prescriptions from an autodialer. If a call is made to that number that is, in fact busy, but reported as disconnected, then no further attempts will be made to that individual by the predictive dialer. This would result in the dialer terminating any further call attempts which would result in the individual not receiving a reminder call to refill their medication.

Although the serving carrier is causing network resources to be wasted if the calling party attempts to reach the called party again, it may be for operational expediency that the service provider maps all these conditions a single, but incorrect, cause code or otherwise provide inconsistent information between in the in-band and out-of-band information. The serving carrier may instead, convey the accurate information via the intercept announcement, with the expectation that a human is comprehending the intercept announcement. The logic may be that the caller (e.g., the person originating the call) will understand and interpret the intercept announcement correctly. If the call originated from a predictive dialer, then it typically will act upon the cause code, and disregard the contents of the intercept announcement. Thus, if the cause code is incorrectly mapped to a user busy condition, the dialer may reattempt calls to that number later in the day, and the following day.

Contact Center Environment

Figure 2:
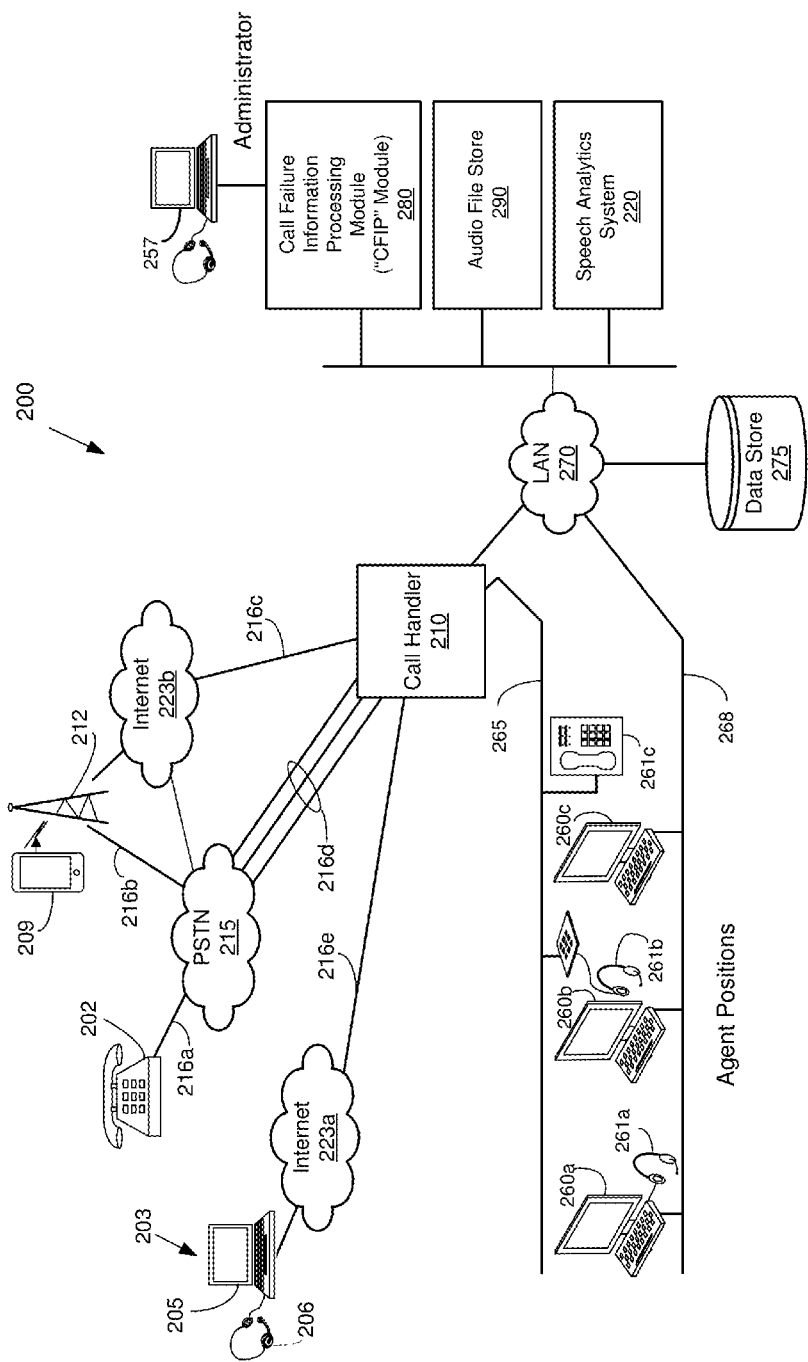
FIG. 2 illustrates one embodiment of a contact center for practicing the concepts and technologies disclosed herein.

FIG. 2 illustrates one embodiment of a call center architecture 200 that may be used in accordance with the various technologies disclosed herein. The call center shown in FIG. 2 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, SMS text messages (a.k.a. text calls or SMS calls), video calls, and chat messages. That is, the call center may be considered a contact center. Thus, for the purposes of the remainder of this disclosure, the term "contact center" is synonymous with "call center" to the extent that they both handle voice calls.

Since the contact center may handle calls originating from a calling party, or initiated to a called party, the term "party" or "remote party" without any further qualification, refers to a person associated with a call processed by the call center, where the call is either received from or placed to the party. Reference to the term "remote party" encompasses either a calling or called party.

Depending on the embodiment, outbound voice calls may originate to remote parties using a variety of different phone types. For instance, the remote party may receive a call from a conventional analog telephone 202 connected to a public switched telephone network ("PSTN") 215 using an analog plain old telephone service ("POTS") line 216a. The calls may be routed by the PSTN 215 and may comprise various types of facilities 216d, including, but not limited to: T1 trunks, SONET based fiber optic networks, ATM networks, etc. Various types of routers, switches, bridges, gateways, and other types of equipment may be involved in the processing of the calls.

Outbound voice calls may also be routed to a mobile phone device 209, such as a smart phone, tablet, or other mobile device, which wirelessly communicates with a mobile service provider ("MSP") 212. The voice calls may be routed by the PSTN 215 over an integrated services digital network ("ISDN") interface 216b or other types of interfaces that are well known to those skilled in the art. In particular embodiments, the MSP 212 may also route calls as packetized voice, referred to herein as voice-over-IP ("VoIP") to an Internet provider 223b using Internet-based protocols. For convenience, unless indicated otherwise, the term "trunk" refers to any type of facility 216c, 216d, or 216e providing voice calls to, or from, the call center, regardless of the type of protocol or technology used. Specifically, a "trunk" is not limited to time-division multiplexing ("TDM") technology.

Outbound voice calls may also be routed to a calling party employing a so-called "IP phone," "VoIP phone," or "soft phone" 203. In one embodiment, this device may comprise a computing device 205, such as a laptop, computing tablet, or other electronic device, which interfaces with a headphone/microphone combination, also referred to as a "headset" 206. An IP phone may use a digital voice control protocol and may process packetized voice data according to various Internet based voice protocols, such as SIP. The call may be conveyed by other types of Internet providers 223a, such as a cable company providing Internet access services over a coaxial cable facility 216e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call using any form of currently available technology and/or originating from any type of device, such as a soft phone 203, a conventional telephone 202, a mobile phone 209, or other device known in the art. The term "call" as used herein may encompass an active instance of two-way voice communication, an attempt to establish two-way voice communication, or a portion of the two-way communication. For example, a user at a conventional telephone 202 can dial a telephone call in an attempt to establish two-way communication, and a call can be said to exist even prior to establishment of a two-way connection. For purposes herein, sending an SMS text may also be referred to as a "text call" or "SMS call." Unless stated otherwise, reference to just "call" or "telephone call" refers to a voice-type call.

Further, a call may be put on hold, and a portion of the call may be referred to as a "call leg" existing between the caller and certain equipment, or between two pieces of equipment. A call may comprise a number of concatenated or joined call legs, which may involve various components at their endpoints, as known to those skilled in the art. A call leg may also be unidirectional or bidirectional with respect to the ability to convey speech. In certain contexts, which will be made explicit, the call may encompass communications other than voice, for example, text, email, video chat, facsimile, etc.

In various embodiments, inbound calls from calling parties to the call center may be received at a call handler 210, which could be, in one embodiment, an automatic call distributor ("ACD"). In particular embodiments, the call handler 210 may be a specialized switch for receiving and routing inbound calls under various conditions. Further, the call handler 210 may be embodied as a dedicated form of equipment readily available from various manufacturers, or the call handler 210 may be a so-called "soft switch" comprising a suitable programming module executed by a processing device to perform the necessary functions. The call handler 210 may route an incoming call over call center facilities 265 to an available agent. Depending on the embodiment, the facilities 265 may be any suitable technology for conveying the call, including but not limited to a local area network ("LAN"), wide area network ("WAN"), ISDN, or conventional TDM circuits. In addition, the facilities 265 may be the same or different from the facilities used to transport the call to the call handler 210.

In other embodiments, the call handler 210 may originate outbound calls to the remote party. In some embodiments, the call handler 210 may be a dialer, such as a predictive dialer, that originates outbound calls designed to meet various criteria. The predictive dialer may then connect an agent at a workstation with the outbound call via a call leg after the remote party answers. Similar to the other components within the call center architecture 200, depending on the embodiment, the dialer may comprise one or more software modules executing on a processing device hardware platform. The call handler may also be a dialer or other call origination device, having various other call origination modes, including, e.g., a pre-view mode or a manual wireless number dialing mode.

In various embodiments, the call handler 210 is typically configured to dial a list of telephone numbers to initiate outbound calls. This may involve accessing a list of call records that is stored in data store 275, which may be accessed over a LAN 270. The calling list may indicate the telephone numbers of all the accounts that are to be dialed that day. Depending on the embodiment, the data store 275 may include one or more databases storing different information such as, for example, records of caller information and account related information. Further, the data store 275 may be integrated with the call handler 210 or segregated as a standalone medium or media.

Thus, in some embodiments, the call handler 210 may include functionality for originating calls, and if so, this functionality may be embodied as a private automatic branch exchange ("PBX" or "PABX"). Further, in other embodiments, the call handler 210 may directly interface with voice trunks using facilities 216c, 216d, and 216e to the PSTN 215 and/or Internet providers 223a, 223b for originating calls. After the calls are originated, a transfer operation by the call handler 210 may connect the call with an agent or a queue, or in some instances the IVR. In various embodiments, the call handler 210 may make use of one or more algorithms to determine how and when to dial a list of numbers so as to minimize the likelihood of a called party being placed in a queue while maintaining target agent utilization.

The call handler may receive various types of call progress information, such as in the form of the aforementioned in-band audio information and/or out-of-band signaling information conveyed over facility 216e, 216d, or 216c. These facilities may be based on various technologies, including those that convey voice an analog or digital form, which may include VoIP or ISDN type interfaces. Various signaling protocols such as those know to those skilled in the art may be used, including SIP, H.323, ISDN Q.931, T1, etc. After the call handler 210 originates a call, it may also connect that portion of the call (e.g., the outbound call leg) with a call leg to the agent, so that the agent is then connected to the remote party. This action may occur after the remote party has answered the call or after the call has been offered to the remote party. Other variations are known to those skilled in the art.

The call handler 210 may also disposition the call in certain instances, which involves recording information as to the outcome of the call. This information may be referred to as a disposition code and the action of determining the appropriate code may be referred to as "dispositioning" the call. Type call outcomes include: busy, no answer, answered, answering machine encountered, call failed, number not in service, number changed, etc. If the agent does speak with the remote party, which can only happen if the call is answered, the agent may then be responsible for entering a disposition code, which reflects the substance of the call. Further, the code entered may depend on the nature of the call. For example, if the call is to collect a debt, the disposition code the agent may enter may reflect that the party made a commitment to pay, indicated they have paid, or indicated they cannot pay.

In various embodiments, a call leg may be routed over facilities 265 to an agent and connected with the other call leg (inbound or outbound) so the agent can service the call. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a specially configured computing device 260a-260c, such as a computer, and a voice device 261a-261c that is adapted for various contact center functions associated with processing communications. The combination of computing device 260a-260c and voice device 261a-261c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 261a-261c at the agent's position. Similarly, "routing the call to the agent" means routing a call to the appropriate equipment at an agent's position. The workstation (i.e., the computer portion) typically has a display or monitor. This is used to convey information to the agent about the calls, and the agent may interact with the call handler using a mouse or other pointing device with the display.

In particular embodiments, the voice device 261a-261c used by an agent may be a soft phone device exemplified by a headset 261a connected to the computer 260a. The soft phone device may be a virtual telephone implemented in part by an application program executing on the computer 260a. Further, the phone may also comprise an Internet Protocol ("IP") based headset 261b or a conventional phone 261c. Use of the term "phone," "telephone," or "voice device" is intended to encompass all these types of devices used by an agent to convey voice on a telephone call, unless indicated otherwise.

Agents typically log onto their workstations prior to handling calls. The workstation may also communicate this information to the call handler. This allows the call center (including the call handler) to know which agents are available for handling calls. In particular embodiments, the call handler 210 may also maintain data of an agent's skill level that may be used to route a specific call to the agent or group of agents having the same skill level. In particular instances, if a suitable agent is not available to handle a call, the call handler 210 may queue the call for the next available agent. As can be expected, various algorithms may be employed to process calls in an efficient manner.

Depending on the embodiment, the interaction between the various components shown may involve using a local area network ("LAN") 270. However, other configurations are possible, such as, but not limited to, using a wide area network, wireless network, router, bridge, direct point-to-point links, etc. For example, the call handler 210 may also establish and bridge a call leg for an outbound call not only to the agent, but also to the speech analytics system ("SAS") 220 over the LAN 270.

Also shown is a Speech Analytics System ("SAS") 220 which may be a real-time speech analytics ("RTSA") system. (The SAS may also be referred to as a speech analytics component, when it is part of a larger system.) This allows the SAS 220 to 'hear' and analyze the audio call progress information that may be received on an outbound call. While the SAS may also be utilized to monitor/analyze both the agent's and the remote party's speech, using it to analyze call progress information, such call failure information, is thought to be a novel application of the SAS. This is because the SIT tones were defined, and are used, to convey the call status information to the originating equipment. One skilled in the art would use the SIT tones, not a SAS to recognize the call status information by analyzing the intercept announcement. It is only because the intercept announcement may provide additional information or inconsistent information relative to the SIT tone that it becomes relevant for the originating equipment to recognize the intercept announcement in addition to the SIT tone.

Application of the SAS to analyze the audio information is typically accomplished by using a conference bridge or similar function in the call handler 210, with a conference call leg to the SAS 220, although the SAS only listens to the speech, and does not interject any speech into the conference bridge. The conference call leg to the SAS 220 may be unidirectional. The SAS system typically interfaces with the LAN 270 to communicate with other components, including the call leg to the call handler 210 and data to a call failure information processing ("CFIP") module 280.

The CFIP module may comprises a set of instructions running on a separate processor, or a set of instructions running on the same processor as found in the call handler. These instructions cause the processor to perform the various operations disclosed herein as corresponding to the functions associated with receiving the in-band and out-of-band call progress information, reconciling the results, and updating the call disposition information in the call record or other system (such as a customer relationship management ("CRM") system, which is not shown in the figures).

In other embodiments, the call handler may cache a portion of the call audio containing the call progress information, and send the call audio to the audio file store 290 for storage. Typically, this portion of the call will be a limited amount of time of the overall call, typically less than a minute. The audio file store 290 may be used for archival storage purposes, or a temporary file store until the audio recordings can be transmitted to the SAS 220 for processing.

Although a number of the above components may be referred to as a "server," each may be also referred to in the art as a "computing device," "unit," "module", "component" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the call handler 210 or other component or module may be combined into a single hardware platform executing one or more software programs. In addition, the call center architecture 200 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the call center.

Those skilled in art will recognize FIG. 2 represents one possible configuration of a call center architecture 200, and that variations are possible with respect to the protocols, facilities, components, technologies, and equipment used.

Call Processing Architecture

Figure 3:
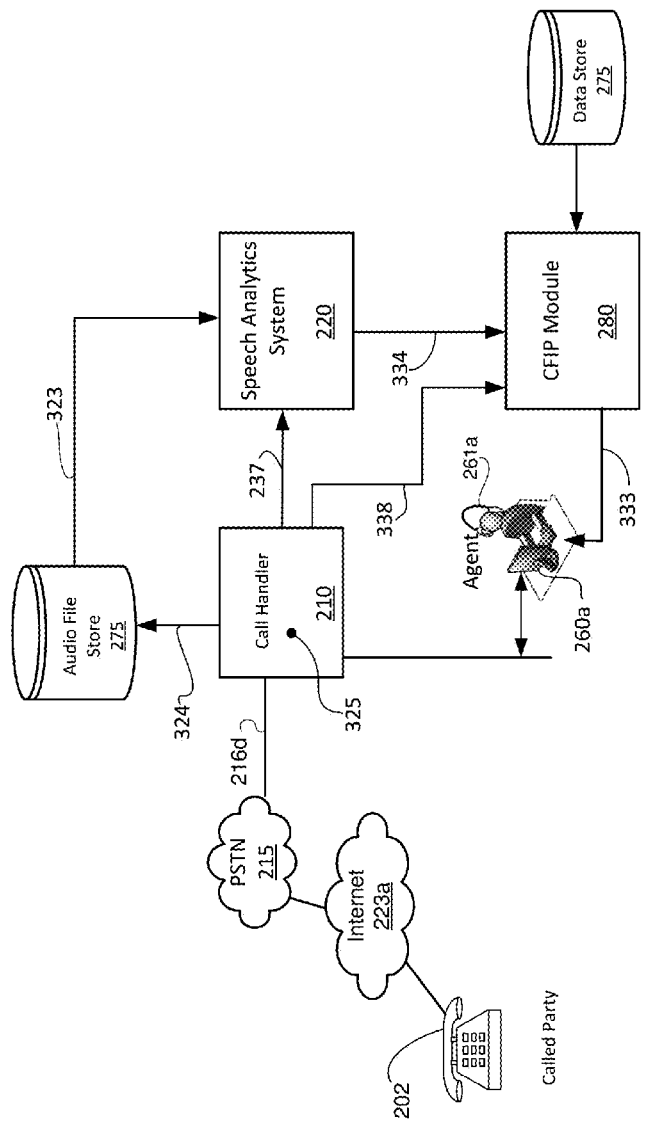
FIG. 3 shows one embodiment of various components and/or modules that may be used for processing in-band and out-of-band information to accurately disposition a call.

While FIG. 2 shows the overall contact center architecture, it is appropriate to further focus on certain components in order to understand how a call would typically be processed by the components in the contact center. For this, FIG. 3 is used. Turning to FIG. 3, a call handler 210 that originates an outbound call over facility 216*d* is shown. In one embodiment, the call handler 210 may be viewed as having a functional conference-like bridge 325 that originates call legs. Initially, a call leg is initiated to the called party's telephone 202 over a facility 216*d*, which may be an ISDN based interface to the PSTN 215. In some cases, the call via the PSTN may interwork with an Internet provider 223*a*, which then routes the call to the remote party's interface, e.g., to telephone 202. (Although a conventional dial-type telephone is shown, it is not limited to a conventional phone as the telephone may be embodied in other forms, such as a VoIP type telephone.)

The call handler, may at some point, establish and connect another leg to the agent's telephone 261*a*. This would allow the agent to hear the call progress tones. Note that in some embodiments, the call handler will only connect the agent to the call if the call is answered by the remote party, so that the agent may not hear the call progress tone. The call handler may also established and bridge another call leg to the speech analytics system 220, so that the speech analytics system may hear and analyze the call progress information encountered. This must be connected prior to receiving the call progress information. In some embodiments, the SAS 220 may not have a call leg established to the call in real-time, as the SAS may analyze the call progress information in non-real time (hence it does not require the call leg established with the call). However, if the SAS does analyze call progress information in real time, then a call leg must be established from the call handler to the SAS for each call.

Assuming that the call to the remote party cannot be completed, e.g., a call failure condition exists, in-band call progress information (more specifically, in-band call failure information) in the form of a SIT tone and/or an intercept announcement will be provided back to the calling party (e.g., the call handler). Because of the bridge 325, the same in-band information will be provided on any other call legs, such as to the SAS. In addition, a cause code will be provided to the call handler over the ISDN facility 216*d*, but via out-of-band signaling. The in-band call progress information is provided to the SAS via the bridge 325, and the cause code information is provided over link 338 to the call failure information processing ("CFIP") module 280. The CFIP module 280 also receives information over link 334 from the SAS 220 that indicates the semantic information conveyed in the intercept announcement. This semantic information may not be a word-for-word indication of the intercept announcement, but may be a mapping of the purpose of the announcement to a numerical code reflecting the content of the intercept announcement and/or SIT tone. For example, human analysis of a set of specific intercept announcements may ascertain that they refer to a condition where the number has been changed, even though the wording of the announcement may be slightly different. When the SAS detects that intercept announcement, it can return a pre-defined code corresponding to that condition.

After the CFIP module 280 receives the out-of-band call failure information from the call handler and the in-band call failure information from the SAS, the CFIP module 280 reconciles the information to the degree that the information is inconsistent. This may involve using rules or data stored in the data store 275. The output of the CFIP module is in the form of a disposition code, which may be stored in the call record or data store 275. In other embodiments, the CFIP module may update another system, such as a CRM system.

Audio Capture and Processing

The term "audio capture" refers to obtaining a copy of the relevant portion of the audio for the call that includes the various in-band audible call failure information. "Audio processing" refers to processing the results of the audio information by the SAS to determine the information conveyed. Further processing is then performed to reconcile the audio information with the out-of-band signaling information so as to determine a system determined call disposition. The details of the processing portion related to reconciliation are discussed below.

What is Captured/when Captured

Only a relative short portion of the call audio needs to be captured, and then only for a relative small portion of the calls. Many calls will be answered (either by a live human, answering machine, or voice mail system) resulting in a connection being established. At that point, when the call is cleared, it will likely be indicated as a normal call clearing process (e.g., cause code #16—normal call clearing). Presumably, there should be no ambiguity when this cause code is returned, because it is provided to clear an answered call. In other words, carriers/end system will properly use this cause code when the call is answered and then cleared, and presumably, there will not normally be any SIT or intercept announcements provided. Similarly, if the call is offered and ringing is encountered (with no answering by the called party or by a voice mail system), then eventually the call handler or calling party (whichever may be the case) will hang up. If the caller continues to listen to ringing without terminating the call, then the network or carrier may terminate the call at some point. Typically, though, the calling party will terminate the call fairly quickly upon not encountering an answer after a certain number of rings.

Another outcome may involve the call reaching a busy condition. The occurrence of a busy condition has decreased over time, historically speaking, because of the increase in services such as call waiting, answering machines, and voice mail services that eliminates the possibility of reaching a busy condition. One estimate is that less than 5% of calls now reach a busy condition. However, when this case occurs, a cause code indicating "User Busy" (Cause Code #17) may be returned and simultaneously, an audible busy signal is provided to calling party. The existence of both a busy audible tone and a busy cause code would function to indicate the existence of a busy condition to a person and/or call handler.

However, in many situations, the carrier will improperly return a user busy cause code (cause code #17) and provide a correct SIT tone and/or intercept announcement. In these situations, the in-band audio information (in form the SIT tone and/or intercept) is inconsistent with the out-of-band signaling information, because the call did not reach a busy condition. Some studies indicate that this situations occurs more than expected, and may occur in over 20% of the calls that are reported as being busy via a cause code. Because there are no SIT tones or intercept announcements returned when a busy condition is reached, any SIT tone or intercept announcements that are provided are necessarily inconsistent with returning a "user busy" cause code.

In such cases, the determination that the audible information is inconsistent with the out-of-band signaling requires analysis of the audio information. In other words, receiving a cause code #17 suggests the user is busy, but it may be inconsistent the provided call treatment, and this can only be verified upon analyzing the in-band audio information. Thus, receiving a "user busy" cause code requires capturing and processing of the audio information to confirm whether the call has actually received a busy condition.

Another potential condition for inconsistent call treatment information involves when a call is attempted to the called party, but is immediately cleared by the network. That is, the call is not even offered to the called party because the call cannot be completed for various reason. For such calls, a SIT tone and/or intercept tone and/or other cause code may be returned. When this occurs, there is the potential for the audio information to be inconsistent with the signaling cause code. However, it would not be unusual for a relative small percentage of calls (e.g., less than 5% of the calls) to encounter this condition. Stated another way, 95-99% of the calls may not require capturing and analyzing the audio, since it is unlikely that any inconsistent information will be returned.

Of the fraction of calls where a SIT tone/intercept is provided along with a cause code, the audio information may require analysis and reconciliation with the cause code. For example, if a call is terminated with a cause code returned indicating the called number is not in service, and the SIT tone and/or intercept announcement also indicates the number is not in service as well, then it may be accepted with a high degree of confidence that the number is not in service. In other words, the SIT tone, intercept announcement, and cause code are all consistent with each other. In this case, no reconciliation of inconsistent information is required. Note however, this still requires receiving and analyzing the two sources of information to determine they are consistent. However, instances where the SIT tone and cause code are inconsistent would then require reconciliation. Other instances may involve a broad cause code and a specific SIT tone/intercept announcement. In this case, the cause code may not be necessarily inconsistent with the audio information, but further processing may be required to most accurately disposition the call.

In some embodiments, analysis may prove beneficial even if the SIT tone/intercept announcement/cause code are consistent. For example, all three sources of the call outcome may indicate the number has been changed. The cause code may not convey the new number, but the intercept announcement may indicate the new number (or vice versa). Processing the audio of the intercept (of additional information found in the cause code) may yield information about the new number, without having to involve an agent manually listening to the announcement.

The time duration of the audio in the call involved that must be recorded is relatively short. A SIT tone sequence typically is limited to less than 1200 ms (1.2 seconds), and the intercept announcement then follows. Typically, the intercept announcement is less than 10-20 seconds. Thus, a typical audio recording portion to be analyzed may be around 12 seconds or less of audio. This short duration means that cache memory can be easily used to store the audio for processing by the SAS. This short duration of audio is referred to herein as an "audio snippet." In summary, only a small percentage of calls are expected to require audio analysis, and for these calls, the audio snippet that is to be analyzed is relatively short. Thus, from a capacity engineering perspective, a single SAS processing engine could service a large number of agent lines.

Real Time Audio Capture and Processing

Real time ("RT") processing requires analyzing the audio in real-time and minimizes the time between when the audio snippet is completed and a determination is made as to how to disposition the call. The disadvantage of this approach is that it may require multiple simultaneously SAS licenses to operate on simultaneous calls. An upper limit exists in a call center, and this would be bounded by the number of agent lines that can have simultaneous calls. For example, a worst case scenario is that a 100 agents may handle 100 simultaneous outbound calls, each of which results in a SIT tone/announcement/cause code information to be returned. Further, this would require that all 100 calls simultaneously incur encountering the call progress information portion of the call. If so, then this would require 100 licenses for the SAS to handle this worst case. In practice, only a small fraction of the 100 agents will have simultaneous calls meeting this condition. Thus, the number of simultaneous licenses required can be engineered based on expected traffic conditions and desired service level, and in this example, would be much less than 100 licenses. Those skilled in the art, upon ascertaining the call volumes, call outcome probabilities, and level of service, could then ascertain the appropriate number of resources required.

However, assuming that there is less than a one-to-one correspondence of the number of simultaneous calls and SAS licenses, then it is possible that a call may be received for which there is no available SAS to analyze the audio. In this situation, the call may go unanalyzed, and procedures need to be defined to indicate how to disposition the call. Since the audio information will go unanalyzed, the only information that can be used is the cause code information. One embodiment is to disposition the call strictly according to the cause code. Another embodiment is to flag it as a tentative disposition based on the cause code, so as to allow subsequent differentiation on call processing of the call record.

However, as will be seen, this can be avoided by providing a "near real-time" architecture where slight queuing delays are accommodated. This can avoid situations where a SAS is currently unavailable, but will be available in a few seconds. For example, if a SAS is available for real-time analysis, then the SAS is used. For those calls which the SAS is unavailable, the audio snippet of that call is cached and sent to the SAS when it becomes available. Hence, the call will be able to have the information analyzed in real-time, or with a slight delay.

Near-Real Time Audio Capture and Processing

Near-real time audio processing reduces the number of simultaneous SAS required to process the audio snippet. Recall that in real-time processing, the SAS must be connected to the call while the call progress information (or call failure information as may be the case) is being received. Assume that this takes 10 seconds. Further assume, that once completed that the processing required by the SAS to recognize the particular condition takes 500 milliseconds (e.g., 0.5 seconds). That means the SAS is occupied for 10.5 seconds, even though the significant processing requires a fraction of the total time.

Compare this to an alternative, where the call progress information is cached and then sent to the SAS as soon as that portion is completed. Once the SAS receives the audio, assume it again requires 0.5 seconds to process. That occupies 0.5 seconds of the SAS, as opposed to 10.5 seconds. That means that the SAS could be processing 20 other calls in this scheme within the 10.5 second duration. Further, if two audio recordings are sent to the SAS at the same time, the audio for one call can be processed in real time while the other will be queued for 0.5 seconds before it is processed, which means that the determination for that delayed call will be made 0.5 seconds later. In essence, the call disposition will be delayed 0.5 seconds. This delay is likely acceptable, even if the agent is delayed from handling another call until the disposition is recorded. In comparison, if two calls attempt to attach to one SAS at the same time, then the one call will be the first call and will occupy 10.5 seconds of the SAS, and the second call cannot be processed for 10.5 seconds. If the second call's audio is not cached, then likely the second call's in-band audio information will have finished. This means that the call progress information for the second call will be lost. If it is cached, then the audio snippet can be sent to the SAS after the first call is processed.

Audio Processing—Reconciliation

Reconciliation refers to the processing of the CFIP module of inconsistent call process information. Typically, this involves analyzing the in-band audio information along with the out-of-band signaling information to determine an outcome of the call. In many cases the information may be consistent, but in other cases, the information may be inconsistent. Inconsistent information may involve an inconsistency between:

a. the SIT tone and the cause code,
b. the intercept announcement and the cause code,
c. the SIT tone and the intercept announcement, or
d. the SIT tone, the cause code, and the intercept announcement.

An example of where all three sources are inconsistent is when the cause code indicates "user busy", the SIT tone indicates the call cannot be completed because no circuits are available, and the announcement indicates the number has been reassigned. In this case, all three forms are fundamentally inconsistent with each other. Resolution of this inconsistency may require extrinsic evidence, such as prior knowledge of what is the actual situation.

In many instances, the information may not necessarily be inconsistent, as one of the information sources may be generic, or may broadly encompass a number of call outcomes. In some situations, a cause code may be returned that reflects a condition that is applicable for the call, but is not the optimal or preferred code for the particular situation. For example, a call may reach an outcome where the called number has been changed to a new number. However, the cause code returned may simply reflect "unallocated number" as opposed to "number changed." Preferably, the terminating network may provide an intercept announcement that indicates "the number has been changed; the new number is [new number]." In this example, the terminating network may broadly use "unallocated number" for numbers not currently assigned as well as numbers which have been disconnected, or for numbers which have changed.

In other example, the network may return a cause code that does not provide specific information. For example the ISDN cause code #4 indicates "send special information tone." Essentially, this indicates that further call outcome information may be provided via in-band information. In such cases, the in-band information may be relied upon for indicating the disposition of the call. This cause code value, by itself, provides little information as to the call disposition.

In another example, a call from the PSTN may interwork to an IP network that may not be able to be complete the call for a number of reasons. The IP network may return a generic cause code (e.g., error code #404—not found) at the point of interworking. (Cause codes in IP networks may also be referred to as error codes.) That cause code may reflect various conditions, e.g., an unassigned number, a user that is not responding to the call, or a network failure (or any number of other conditions). The interworking point may map that #404 cause code to various ISDN type cause codes, such as cause code #127—Internetworking—unspecified. Again, such a cause code, by itself, provides little useful call disposition information, and it may be that more specific information is provided in the intercept announcement.

Figure 4:
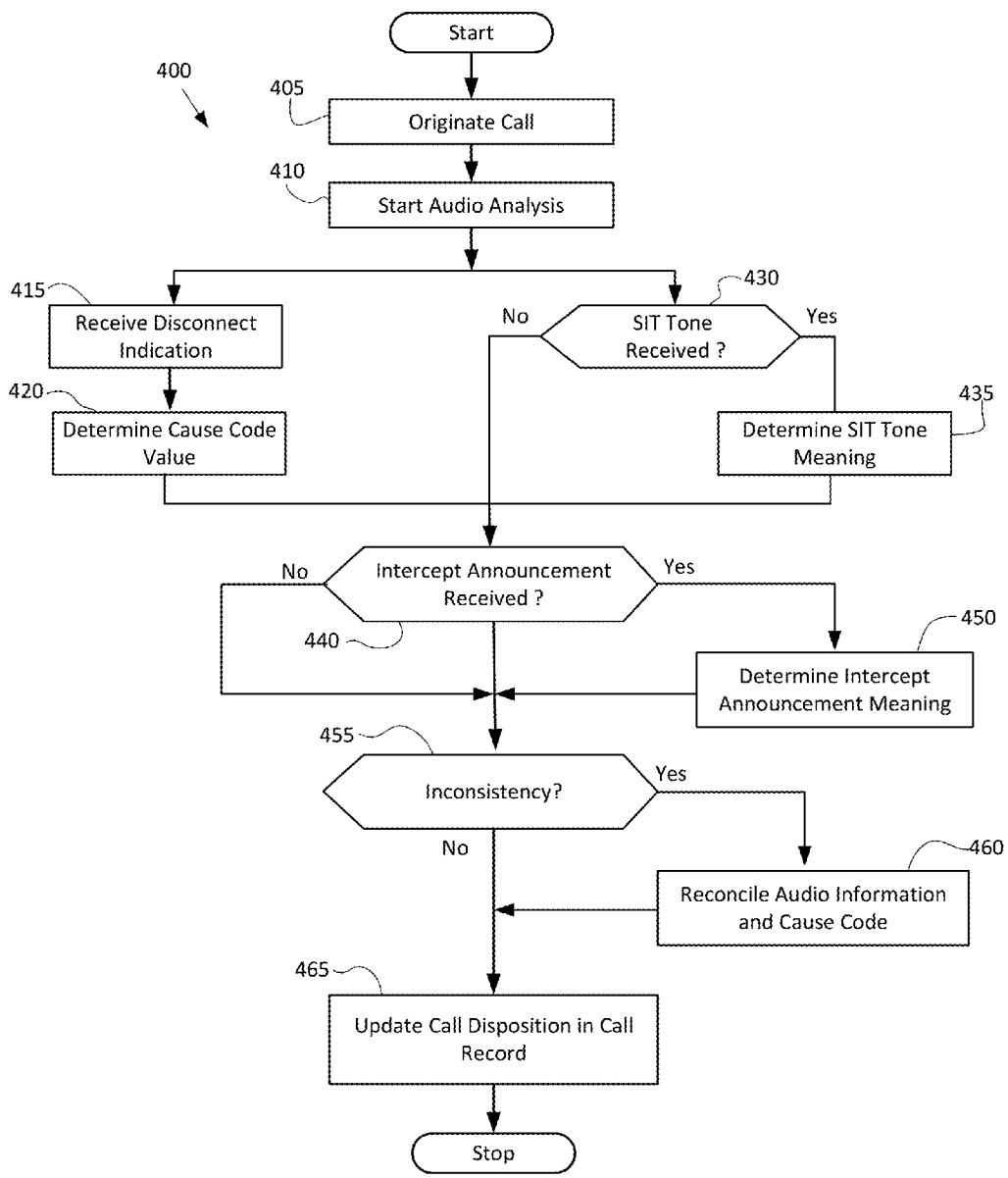
FIG. 4 illustrates at a high level, one embodiment of a process flow for processing in-band and out-of-band information to accurately disposition a call.

One such process flow for processing in-band and out-of-band information is shown in FIG. 4. Turning to FIG. 4, the process 400 begins with originating the outbound call in operation 405. Then, if real-time audio analysis is being performed, this commences in operation 410. Next information may be received from two separate sources. Proceeding with the left branch, a call clearing messages, such as an ISDN DISCONNECT or RELEASE message may be received in operation 415. That message may contain a cause code parameter, and this is determined in operation 420.

Information may also be received in-band, and this is reflected on the right branch, starting with a determination in operation 430 whether a SIT tone or a recognizable series of tri-tones are received in operation 430. Some carriers may return a brief tone or musical jingle, which is not a standardized SIT tone. If a SIT tone is received, then it is analyzed by the SAS in operation 435. If the SIT tone is not received, then this step is skipped.

Next, a determination is made whether the intercept announcement was received in operation 440. If yes, the intercept announcement is analyzed in operation 450. Otherwise, the operation proceeds to operation 455. At this point, a test is made to determine if there is any inconsistency with the cause code and the audible information received. If there is an inconsistency, then the information is reconciled in operation 460. This may involve the application of various rules or extrinsic information to ascertain which information is to be given a greater weight in determining it relevancy in determining the call disposition. Once this is accomplished, then the call disposition is reflected in the call record in operation 465.

The order of the sequence of steps may be different than shown. For example, a call typically will encounter a SIT tone, an intercept, and then the audible channel will be cleared by sending the RELEASE message with a cause code. Typically, the response to receiving a RELEASE message is to release the audio channel, and hence any audible information cannot be received after that point.

Rule Processing

In the case of inconsistent call status information, the application of a rule may be used to determine the call outcome and hence the disposition that will be recorded. The set of rules can be a table-based listing of all the possible combinations, with the outcome to be used. In other embodiments, the rules may involve ignoring certain broad based cause codes in certain situations and applying the in-band information to determine the disposition. For example, if the cause code is "cause code #4—send special information tone", then the disposition should be based on the SIT tone/intercept announcement received. In this case, the SIT tone and intercept announcement may require further reconciliation. For example, the SIT tone may indicate "number changed or disconnected" (which could apply to either condition) whereas the intercept announcement may indicate a specific situation, such as the number has changed. Thus, the most specific, and likely most accurate information for this combination of call status information, is that the number has been changed.

Experience may factor into how to define the rules. For example, experience may indicate that many or certain carriers are returning "cause code #17—user busy" when in fact, the number is not in service or that the number cannot be completed as dialed. Based on experience, the rule may define the call disposition as "number unassigned" as opposed to "user busy." In other situations, the rule may require confirmation that the user, is, in fact, busy, based on analyzing other audible information being provided (e.g., a busy audio signal). The development of such rules may require manual verification and analysis of what is the expected most accurate outcome that should be recorded in each combination of call status information. Once this is determined and reflected in the rule, then the CFIP module can apply the rule. An audio busy signal it can be considered as call progress information and could be processed by the SAS to aid in accurately determining the call disposition. Essentially, the SAS is not limited to only processing call failure information, but can process call progress information, such as a busy signal.

Figure 5:
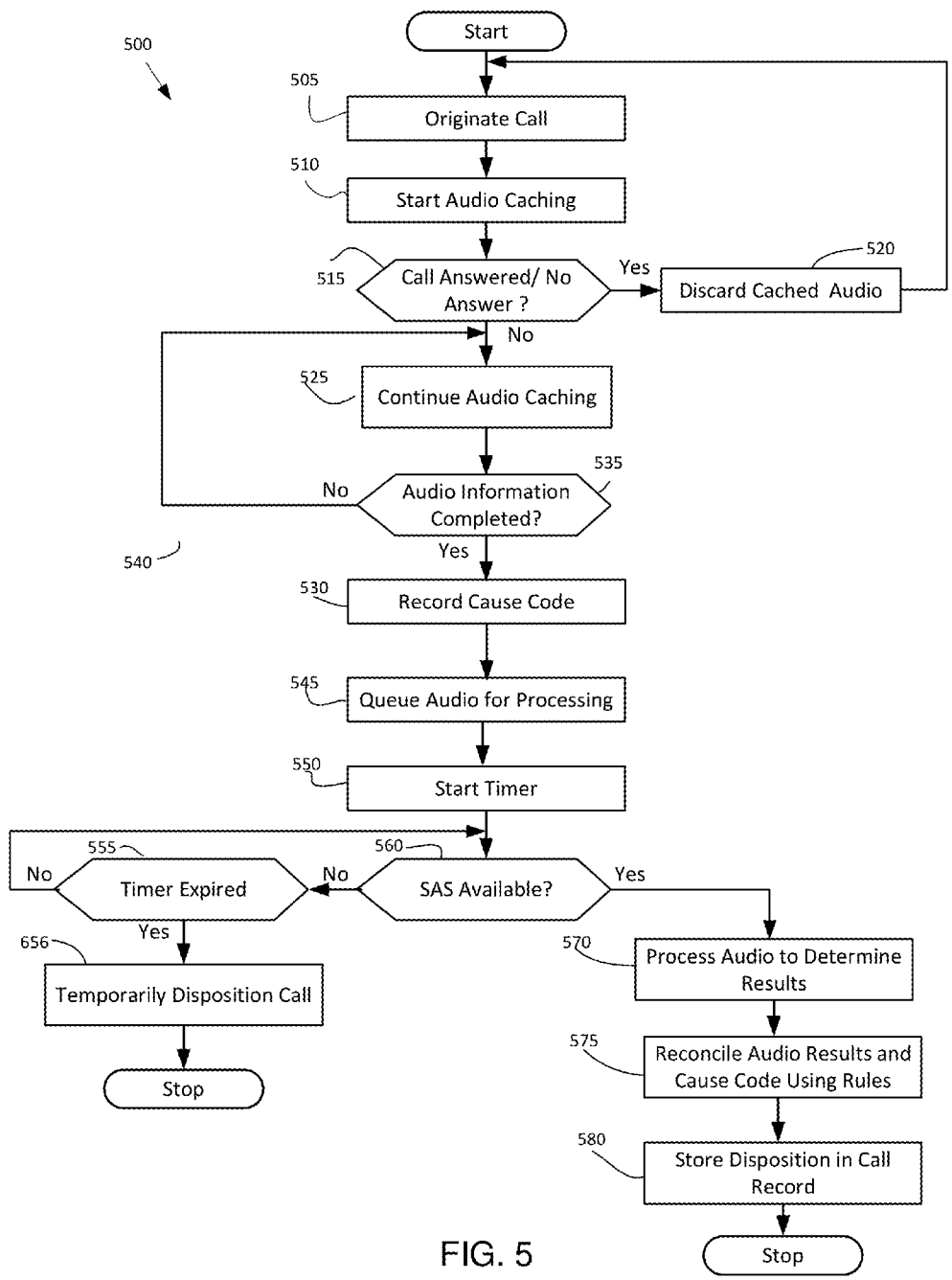
FIG. 5 illustrates at a high level, one embodiment of a process flow for recording audio of the call progress information for processing thereof.

Another process flow focusing on the processing of audio information is shown in FIG. 5. This process 500 also begins with originating a call in operation 505. Once the call commences, audio caching is started in operation 510. This operation presumes near-real time analysis, e.g., wherein the SAS is not bridged onto the call. If it is determined in operation 515 that the call has been offered and ringing has occurred, then it can be deduced that the call will be either answered or not answered. In other words, the presence of ringing means that there is no ambiguity as to the call outcome—it will be one of the two options. If so, then the cached audio can be discarded in operation 520, and the process can begin anew with another call.

Otherwise, the process continues to operation 525 where audio caching continues. A test in operation 535 determines if the audio information is completed, if not, then the process loops back to operation 525 to continue caching the audio. The audio being cached is of limited duration, as the announcement is relative brief, and typically repeated only once. After that, the call is cleared and a cause code will be returned to the calling party. The cause code can be stored in operation 530, and linked or associated with the call.

Next, the audio snippet that was cached is queued for audio processing in operation 545. A timer may be started in operation 550, to limit the waiting time if the SAS is not available in operation 560. If the SAS is available in operation 560, then the audio is processed in operation 570 to determine the results—e.g., determine what the audio information conveyed. Now that the audio information is known, it can be reconciled with the cause code results in operation 575. At this point, external rules may be used to reconcile the information. Once completed, the call disposition code may be stored in the call record in operation 580.

If the SAS is not available in operation 560, the process continues to check whether the timer has expired in operation 555. If not, then the process returns to check whether the SAS is available in operation 560. Essentially, this process waits for the SAS to become available, but only waits as long as the timer has not expired. If the timer has expired in operation 555, then a temporary disposition code is stored in the call record in operation 656. Other procedures may subsequently review the audio information and then reconcile it with the cause code. However, the timer ensures that a limited amount of time will be spent waiting for the SAS. In some embodiments, the agent may be prevented from handling another call if the call is not dispositioned, and hence, a timer prevents the agent from being non-productive if an abnormal condition arises.

Figure 6:
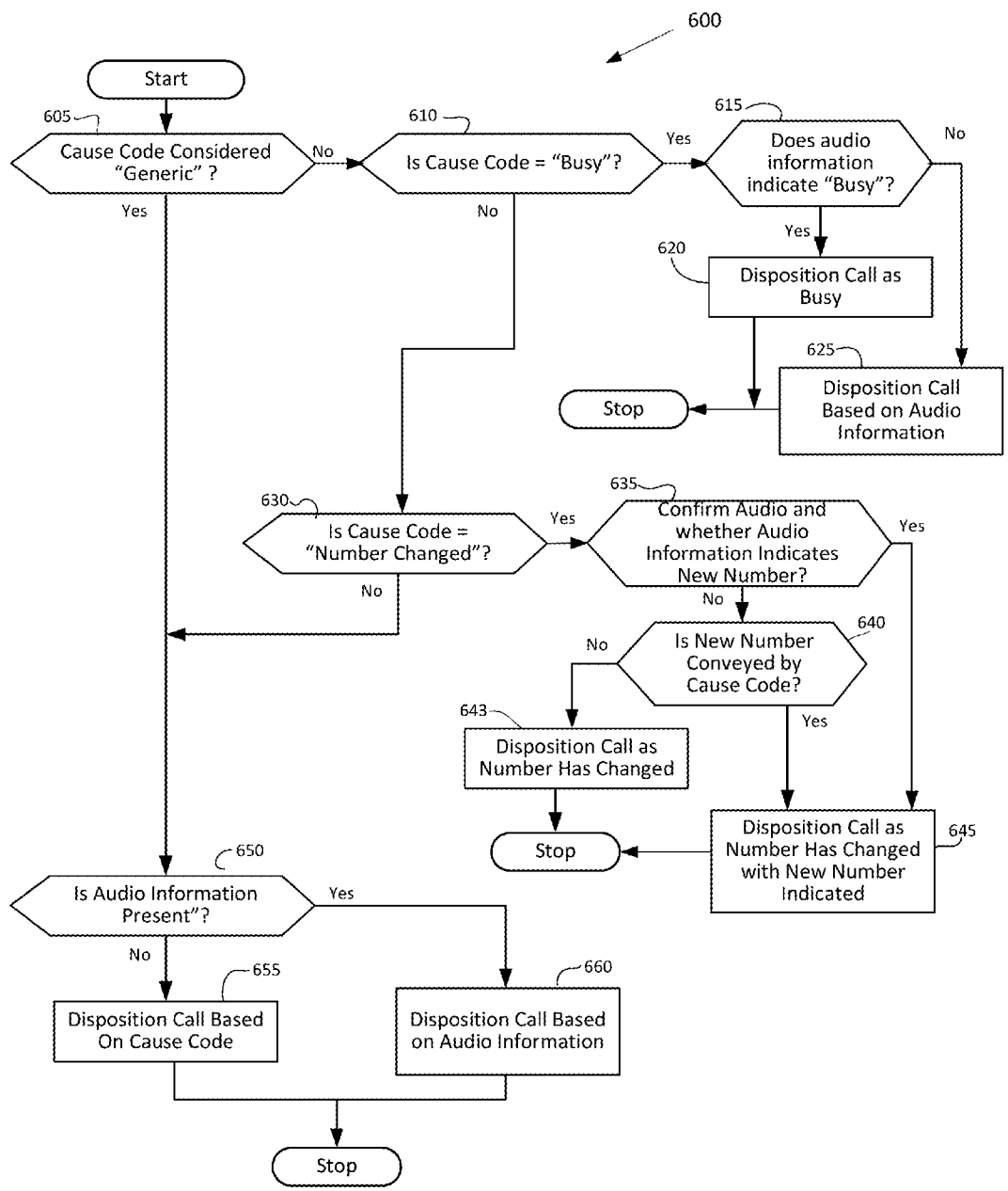
FIG. 6 illustrates at a high level, one embodiment of the application of rules to process call failure information in order to disposition a call.

The nature of the rules used to aid in reconciling the in-band and out-of-band information may vary. One such limited example of a process flow for rules processing is shown in FIG. 6. Turning to FIG. 6, the process 600 may be implemented in various ways. The steps shown herein represent only one embodiment wherein rules can be applied to ascertain a final disposition code, and FIG. 6 reflects a limited example. This example presumes that both a cause code and in-band audio information in the form of an intercept announcement are received. In other embodiments, one form of information may not be provided, in which case the rules may require simply using the form of information that is provided.

An initial test may occur in operation 605, which involves analyzing the cause code. In some embodiments, the cause code may be considered as 'generic.' As to which codes are defined as 'generic' may vary in each implementation. For example, if a SIP based error code #404 is returned, very little specific information is indicated by that cause code itself, other than the call failed. In other embodiments, an ISDN cause code #4 "Send Special Information Tone" may be sent. This cause code reflects that audio information may be expected that provides further information about the call. Specifically, the audio information may comprise a SIT tone, an intercept announcement, or both. However, by itself, that particular cause code does not provide accurate information as to the call disposition.

In other embodiments, the cause code may reflect a value that is known to be used in a generic or inaccurate manner, even though the cause code itself may reflect a specific condition. In other embodiments, the specific cause code may not provide very much useful information. For example, cause code #0, "valid cause code not yet received" may be treated as a "generic" cause code. (This cause code value may correspond to the situation where the remote service provider or interworking carrier has not provided a valid cause code.) In this case, the meaning assigned to this cause code cannot be relied upon for determining the call disposition.

If the cause code is not considered generic in operation 605, but specific, then a series of tests may be performed to determine what particular cause code is present. For example, a test in operation 610 may occur to determine whether the cause code indicates a "user busy" condition. If yes, then another test may occur in operation 615 to analyze whether the in-band information also conveys a "user busy" condition. This condition may be indicated by a busy audio signal, a SIT tone, and/or an intercept announcement. If so, then the process may continue by dispositioning the call as busy in operation 620. As will be seen, if the out-of-band cause code and the in-band audio are consistent, then that condition is likely to be accurate and the call can be dispositioned based on the indicated condition.

If, in operation 615, the audio information indicates something other than "user busy", then the process continues to operation 625 where the audio information is solely used to disposition the call. This is because some carriers will use a cause code #17 "user busy" to reflect a number of conditions, and expect that the calling party will listen to the in-band information, typically the intercept announcement, to determine the correct call condition. Thus, the audio in-band information may be used to the exclusion of the cause code in this particular instance to determine how to disposition the call. The process is then completed for this call.

If the cause code is not generic in operation 605, and not a "user busy" code in operation 610, then the process continues to test the cause code for another specific value. There may be any number of such additional tests define as part of the rules processing to identify each specific value as may be needed to be identified. In operation 630, the test determines whether the cause code reflects whether the number has changed. If so, then the process continues to operation 635, which may determine whether the audio confirms the number has been changed, and if so, then whether it indicates the new number in operation 635. If it does, then the process continues to operation 645 where the call is dispositioned as having a changed number and the new number is recorded as well.

If the audio information does not confirm the new number in operation 635, than a test may occur in operation 640 to determine whether the new number is indicated in the cause code. If so, then the processing continues to operation 645.

Otherwise, the processing continues to operation 643 where the disposition simply reflects the number has been changed, without noting the new number.

Although this aspect of FIG. 6 only shows specific processing for two particular cause codes (610, 630), there may be a number of such cause code-specific processing for each cause code that is not considered generic. If the cause code is considered generic, then the processing continues to operation 650, where a test is made to determine if audio information is present. If so, then the call disposition may be solely based on the audio information (whether it be a SIT tone and/or an intercept announcement) in operation 660. If audio information is not present, then the process continues to operation 655, the disposition may be based on the cause code only. In such cases, a rather generic or broad disposition code may be used.

The rules-based processing may vary than from what is shown. In other embodiments, consideration of the particular transit or terminating networks may be taken into account. Certain networks may be known as having certain policies for using certain cause codes in non-standard ways. For example, it may be known that Network A may return a cause code 17 "user busy" when the called party is actually busy and when the number has changed. It may be known that Network B returns cause code #17 only when the called party is busy, and returns a different cause code, cause code #22 "number changed," when the number has changed. Thus, the rules processing may take into account the remote network (to the extent that this is known and conveyed to the CFIP module) and provide different processing rules for these different carriers under appropriate circumstances.

Call Record Updating

The outcome of the rules processing is used to determine the disposition of the call, and this information is recorded with the call record in the form of a disposition code. In addition to recording the disposition that is determined, additional information may be recorded as to how the disposition was determined. For example, some disposition codes are determined by the agent after speaking with the called party. For example, for calls that were answered, the agent may disposition the call as the called party indicating a promise to make a payment.

However, the codes that are determined by the CFIP module, which may be based on processing the in-band and out-of-band information, may record information as to whether the outcome was based on a rule, whether there was conflicting information that was resolved, or other information. This may provide information as to the relative confidence of the outcome. In other embodiments, a confidence score may be also recorded to reflect the process used. For example, if the cause code, SIT tone, and intercept announcement are all consistent, the confidence score may be 100% or very high. However, if the cause code is generic in nature, as is the SIT tone, but the intercept is very specific, then the confidence score may be lower. If all three information sources are inconsistent, then the confidence score may be still lower, e.g., less than 50%.

TCPA Processing Impacts

Disconnected Number Versus Reassigned Numbers

Determining the disposition of a call accurately is important for various aspects, including achieving compliance with various federal regulations, such as the Telephone Consumers Protection Act ("TCPA") that governs in part, the calling of wireless numbers. Dialing a wireless number is allowed when express consent is obtained from the called party and when using certain equipment, known as an "autodialer." An autodialer is equipment which is restricted from being used to call wireless numbers (and other numbers) without the express consent of the user of the wireless number (see, e.g., TCPA and related Federal Communications Commission regulations for further information as to what constitutes an autodialer). Without the proper consent, the wireless number cannot be called using the autodialer, and should be dialed manually.

It is not unusual to have obtained consent to call an individual at a particular wireless number, but then have the subscriber disconnect their wireless service so that the number is reassigned to another subscriber. If the contact center is unaware of this situation, they may be dialing the new subscriber at that wireless number with an autodialer, when in fact, they do not have the new subscriber's consent. This can give rise to liability to the contact center operator.

When a number is disconnected, the service provider typically will provide an intercept announcement indicating the number is disconnected. The announcement informs callers of the situation, and presumably, the caller will no longer dial that number upon learning it is disconnected. The number will remain in this state for a limited amount of time before being allocated to a new subscriber. The longer it remains in this unassigned state, the more likely that callers will be informed. When the number is reassigned to a new subscriber, hopefully the number of calls is minimized that are directed to old subscriber but are received by the new subscriber. However, depending on market conditions, the service provider may reassign the number in a few weeks to a new subscriber. In other situations, the number will remain unassigned for 30, 60, or 90 days before reassignment.

If the contact center dials the number in the reassigned state, the accurate determination of the call status is important. If the cause code, SIT tone, and intercept announcement indicate that that the number is disconnected, or reassigned, then the contact center knows to terminate calling that number, and potentially obtain a new, current number for that subscriber. If the cause code returned indicates "user busy" (which is inaccurate), but the intercept announcement indicates the number is disconnected, then it is vital that the contact center properly identify the inconsistency and disposition the call accurately. Thus, if there is any uncertainty, the number may be dispositioned, but a flag in the call record may indicate that manual confirmation may be required. If the contact center merely relies upon the cause code, the contact center may schedule future calls to that number. When that number is reassigned, then such calls made by an autodialer may violate applicable federal regulations.

Number has Changed—No Further Information Available (without New Number)

In some circumstances, the call failure status information may indicate that the number has changed, which indicates the number is not currently associated with the subscriber, and that a number has been reassigned, but that information is not provided in the cause code or the intercept announcement. The fact that the number has changed informs the contact center that the current number should not be used, but that there is another number that should be used. At this point, the contact center may automatically invoke, or manual initiate, a skip-trace request for that party's current number. The skip-trace vendor typically receives information about the called party, such as their name, social security number, age, last known address, last known telephone number, etc., and will search various public data sources to return a current telephone number. This process may occur automatically via a message query over the Internet to the skip-trace vendor, or may be manually processed.

Number has Changed—with New Number

In some embodiments, the in-band and/or out-of-band information will indicate that the number has been changed, and the new number may be indicated either in-band and/or out-of-band. In many instances, the new number will be provided via an intercept announcement. In such cases, the speech analytics system can analyze and provide information as to the new number, which the CFIP module can use to update the record. In other embodiment, the record may be flagged to allow human determination of the new number or human verification of the new number determined by the system.

Exemplary Processing Device Architecture

Figure 7:
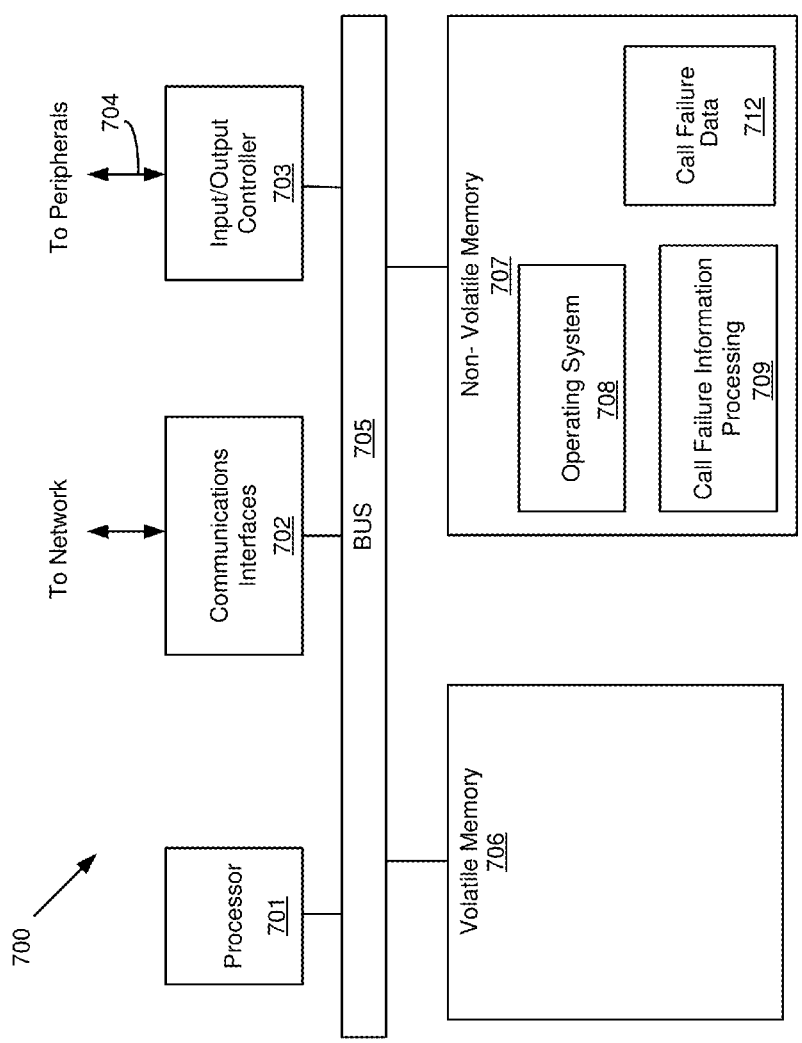
FIG. 7 illustrates one embodiment the high level architecture of a processing system for practicing the concepts and technologies disclosed herein.

FIG. 7 is an exemplary schematic diagram of a processing system 700 that may be used in an embodiment to practice the technologies disclosed herein, such as the call handler 210, CFIP module 280, or speech analytics system 220. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein, including those entities executing software.

As shown in FIG. 7, the processing system 700 may include one or more processors 701 that may communicate with other elements within the processing system 700 via a bus 705. The processor 701 may be implemented as one or more complex programmable logic devices ("CPLD"), conventional microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, integrated circuit processors, other circuitry, or the like.

In one embodiment, the processing system 700 may also include one or more communications interfaces 702 for communicating data via the local network with various external devices, including those shown in FIG. 2. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 703 may also communicate with one or more input devices or peripherals using an interface 704, such as, but not limited to: a keyboard, a mouse, a touch screen/display input, microphone, pointing device, etc. The input/output controller 703 may also communicate with output devices or peripherals, such as displays, printers, speakers, headsets, banner displays, etc.

The processor 701 may be configured to execute instructions stored in volatile memory 706, non-volatile memory 707, or other forms of non-transitory computer-readable storage media accessible to the processor 701. The volatile memory 706 may comprise various types of memory technologies, including, but not limited to: random access memory ("RAM"), dynamic random access memory ("DRAM"), static random access memory ("SRAM"), and other forms well known to those skilled in the art. The non-volatile memory 707 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 707 may store program code and data, which also may be loaded into the volatile memory 706 at execution time. Specifically, the non-volatile memory 707 may store one or more computer program modules, such as a call failure information processing 709 containing instructions for performing the process and/or functions associated with the technologies disclosed herein, and related call failure data 712 such as keyword sets, and/or operating system code 708. In addition, the call failure information processing 709 may generate or access the call failure data 712 in the non-volatile memory 707, as well as in the volatile memory 706. The volatile memory 706 and/or non-volatile memory 707 may be used to store other information including, but not limited to: records, applications, programs, scripts, source code, object code, byte code, compiled code, interpreted code, machine code, executable instructions, or the like. The volatile memory 706 may include keyword sets, action sets, and other related data to implement the concepts and technologies disclosed herein. These instructions may be executed or processed by, for example, the processor 701. These may form a part of, or may interact with, the call failure information processing 709 and/or call failure data 712.

The technologies described herein may be implemented in various ways, including as computer program products comprising memory storing instructions causing a processor to perform the operations associated with the above technologies. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

The computer program product comprises a tangible, non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Claim Interpretation Aspects

The claims herein should not be construed as being written in "means-plus-function" form, unless the word "means" is explicitly used in the claim. Applicant invokes application of 35 U.S.C. §112, ¶6 only when the word "means" is explicitly used in a claim. Thus, for example, "module" is not to be interpreted as written in "means-plus-function" form where as "module means" is intended to be written in "means-plus-function" form.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

APPENDX 1

Q.931 Cause Code Values
Code Cause
  0 Valid cause code not yet received
  1 Unallocated (unassigned) number
  2 No route to specified transit network (WAN)
  3 No route to destination
  4 send special information tone
  5 misdialled trunk prefix.
  6 Channel unacceptable
  7 Call awarded and being delivered in an established channel
  8 Prefix 0 dialed but not allowed
  9 Prefix 1 dialed but not allowed
  10 Prefix 1 dialed but not required
  11 More digits received than allowed, call is proceeding
  16 Normal call clearing
  17 User busy
  18 No user responding
  19 no answer from user
  21 Call rejected
  22 Number changed
  23 Reverse charging rejected
  24 Call suspended
  25 Call resumed
  26 Non-selected user clearing
  27 Destination out of order
  28 Invalid number format (incomplete number)
  29 Facility rejected
  30 Response to STATUS ENQUIRY
  31 Normal, unspecified
  33 Circuit out of order
  34 No circuit/channel available
  35 Destination unattainable
  37 Degraded service
  38 Network (WAN) out of order
  39 Transit delay range cannot be achieved
  40 Throughput range cannot be achieved
  41 Temporary failure
  42 Switching equipment congestion
  43 Access information discarded 44 Requested circuit channel not available
45 Pre-empted
46 Precedence call blocked
47 Resource unavailable—unspecified
49 Quality of service unavailable
50 Requested facility not subscribed
51 Reverse charging not allowed
52 Outgoing calls barred
53 Outgoing calls barred within CUG
54 Incoming calls barred
55 Incoming calls barred within CUG
56 Call waiting not subscribed
57 Bearer capability not authorized
58 Bearer capability not presently available
63 Service or option not available, unspecified
65 Bearer service not implemented
66 Channel type not implemented
67 Transit network selection not implemented
68 Message not implemented
69 Requested facility not implemented
70 Only restricted digital information bearer capability is available
79 Service or option not implemented, unspecified
81 Invalid call reference value
82 Identified channel does not exist
83 A suspended call exists, but this call identity does not
84 Call identity in use
85 No call suspended
86 Call having the requested call identity has been cleared
87 Called user not member of CUG
88 Incompatible destination
89 Non-existent abbreviated address entry
90 Destination address missing, and direct call not subscribed
91 Invalid transit network selection (national use)
92 Invalid facility parameter
93 Mandatory information element is missing
95 Invalid message, unspecified
96 Mandatory information element is missing
97 Message type non-existent or not implemented
98 Message not compatible with call state or message type non-existent or not implemented
99 information element nonexistent or not implemented
100 Invalid information element contents
101 Message not compatible with call state
102 Recovery on timer expiry
103 parameter non-existent or not implemented—passed on
111 Protocol error unspecified
127 Internetworking, unspecified

APPENDIX 2

SIP Cause Codes (a.k.a. Error Codes)

APPENDIX 2

| SIP Cause Codes (a.k.a. Error Codes) | |
| --- | --- |
| SIP Code | Cause String |
| 401 | CALL_REJECTED |
| 402 | CALL_REJECTED |
| 403 | CALL_REJECTED |
| 407 | CALL_REJECTED |
| 603 | CALL_REJECTED |
| 404 | UNALLOCATED_NUMBER |
| 485 | NO_ROUTE_DESTINATION |

APPENDIX 2-continued

| SIP Cause Codes (a.k.a. Error Codes) | |
| --- | --- |
| SIP Code | Cause String |
| 604 | NO_ROUTE_DESTINATION |
| 408 | RECOVERY_ON_TIMER_EXPIRE |
| 504 | RECOVERY_ON_TIMER_EXPIRE |
| 410 | NUMBER_CHANGED |
| 413 | SWITCH_CAUSE_INTERWORKING |
| 414 | SWITCH_CAUSE_INTERWORKING |
| 416 | SWITCH_CAUSE_INTERWORKING |
| 420 | SWITCH_CAUSE_INTERWORKING |
| 421 | SWITCH_CAUSE_INTERWORKING |
| 423 | SWITCH_CAUSE_INTERWORKING |
| 505 | SWITCH_CAUSE_INTERWORKING |
| 513 | SWITCH_CAUSE_INTERWORKING |
| 480 | CAUSE_NO_USER_RESPONSE |
| 400 | NORMAL_TEMPORARY_FAILURE |
| 481 | NORMAL_TEMPORARY_FAILURE |
| 500 | NORMAL_TEMPORARY_FAILURE |
| 503 | NORMAL_TEMPORARY_FAILURE |
| 486 | USER_BUSY |
| 600 | USER_BUSY |
| 484 | INVALID_NUMBER_FORMAT |
| 488 | INCOMPATIBLE_DESTINATION |
| 606 | INCOMPATIBLE_DESTINATION |
| 502 | NETWORK_OUT_OF_ORDER |
| 405 | SERVICE_UNAVAILABLE |
| 406 | SERVICE_NOT_IMPLEMENTED |
| 415 | SERVICE_NOT_IMPLEMENTED |
| 501 | SERVICE_NOT_IMPLEMENTED |
| 482 | EXCHANGE_ROUTING_ERROR |
| 483 | EXCHANGE_ROUTING_ERROR |
| 487 | ORIGINATOR_CANCEL |
| Others | NORMAL_UNSPECIFIED |

The invention claimed is:

1. A system for processing call related information, comprising:
a call handler configured to:
originate an outbound call to a telephone number associated with a called party,
receive a cause code over an interface from a communications network receiving the outbound call from the call handler,
receive audible call progress information provided in-band from the communications network,
receive call status information from a speech analytics component ("SAC") derived from the SAC analyzing the audible call progress information,
ascertain a disposition code based on the cause code information and the call status information, and
store the disposition code in association with a call record of the outbound call; and
the speech analytics component configured to:
analyze audible call progress information provided in-band to the call handler on the outbound call, and
provide the call status information to the call handler.

2. The system of claim 1, wherein the call handler originates the outbound call over the interface using an integrated services digital network ("ISDN") signaling protocol.

3. The system of claim 1, wherein the call handler originates the outbound call over the interface using a session initiated protocol ("SIP") signaling protocol.

4. The system of claim 1, wherein the audible call progress information comprises an intercept announcement.

5. The system of claim 1, wherein the audible call progress information comprises a special information tone.

6. The system of claim 1, wherein the call handler maintains a call leg to the SAC bridged onto the outbound call while the audible call progress information is received by the call handler.

7. The system of claim 1, wherein the speech analytics component is further configured to:
receive the audible call progress information from a memory in the call handler storing an audio snippet comprising the audible call progress information.

8. A non-transitory computer readable medium storing instructions, that when executed, cause a computer processor to:
receive a first input from a speech analytics component providing call status information based on analyzing audible in-band call progress information on an outbound call originated from a call handler in a contact center;
receive a second input comprising out-of-band cause code information based on a cause code received from a communications network on an interface over which the outbound call originated from the call handler to the communications network; and
determine a disposition code based on the first input and the second input, wherein the disposition code reflects an outcome associated with the outbound call.

9. The non-transitory computer readable medium of claim 8, wherein the audible in-band call progress information comprises an intercept announcement.

10. The non-transitory computer readable medium of claim 8, wherein the interface comprises a voice over internet protocol ("VoIP") interface using a session initiated protocol ("SIP") to convey the cause code.

11. The non-transitory computer readable medium of claim 8, wherein the in-band call progress information comprises a special information tone ("SIT").

12. The non-transitory computer readable medium of claim 8, wherein the audible in-band call progress information is retrieved from a memory and stored as audio data.

13. The non-transitory computer readable medium of claim 8, further comprising instructions that cause the computer processor to:
store the disposition code in a call record comprising a telephone number to which the outbound call was directed.

14. A method for processing a telephone call, comprising:
originating an outbound telephone call by a call handler at a contact center to a remote interface of a called party;
receiving in-band call progress information comprising an intercept announcement at the call handler;
providing the intercept announcement to a speech analytics component;
receiving out-of-band call progress information at the call handler comprising a cause code having a cause code value reflecting a reason why the outbound telephone call was not completed to the remote interface;
analyzing the intercept announcement using the speech analytics component to generate call status content information;
providing the call status content information from the speech analytics component to a computer processor in the call handler;
determining a disposition code by the computer processor based on the cause code value and the call status content information; and
updating a call record associated with the outbound call by the call handler to reflect the disposition code.

15. The method of claim 14, further comprising:
establishing a call leg from the call handler to the speech analytics component to convey the in-band call progress information to the speech analytics component.

16. The method of claim 15, wherein an audio snippet comprising the in-band call progress information is cached and conveyed to the speech analytics component.

17. The method of claim 14, wherein the in-band call progress information further comprises a special information tone.

18. The method of claim 17, wherein the speech analytics component uses at least a plurality of frequencies of the special information tone to determine the call status content information.

19. The method of claim 14, further comprising:
storing the in-band call progress information comprising the intercept announcement in a memory, wherein providing the intercept announcement to the speech analytics component further comprises retrieving the in-band call progress information from the memory.

20. The method of claim 14, wherein the step of determining the disposition code by the computer processor based on the cause code value and the call status content information comprises:
determining the cause code value is inconsistent with the call status content information; and
selecting the disposition code using the call status content information.

* * * * *